US011629520B1

(12) United States Patent
Geraghty

(10) Patent No.: US 11,629,520 B1
(45) Date of Patent: Apr. 18, 2023

(54) MOVABLE DECORATIVE BASE ASSEMBLY SELECTIVELY ATTACHABLE TO A PARASOL OR UMBRELLA

(71) Applicant: Edward Geraghty, Pompano Beach, FL (US)

(72) Inventor: Edward Geraghty, Pompano Beach, FL (US)

( * ) Notice: Subject to any disclaimer, the term of this patent is extended or adjusted under 35 U.S.C. 154(b) by 280 days.

(21) Appl. No.: 16/841,286

(22) Filed: Apr. 6, 2020

Related U.S. Application Data

(60) Provisional application No. 62/829,956, filed on Apr. 5, 2019.

(51) Int. Cl.
| | | |
|---|---|---|
| *A45B 23/00* | (2006.01) | |
| *A01G 9/02* | (2018.01) | |
| *E04H 12/22* | (2006.01) | |
| *B62B 5/00* | (2006.01) | |

(52) U.S. Cl.
CPC .......... *E04H 12/2269* (2013.01); *A01G 9/02* (2013.01); *A45B 23/00* (2013.01); *B62B 5/0083* (2013.01); *E04H 12/2238* (2013.01); *E04H 12/2246* (2013.01); *E04H 12/2276* (2013.01); *A45B 2023/0006* (2013.01); *A45B 2023/0012* (2013.01)

(58) Field of Classification Search
CPC .......... A45B 223/00; A45B 2023/0006; A45B 2023/0012; A45B 23/00; E04H 12/2238; E04H 12/2246; E04H 12/2269; E04H 12/2276; A01G 9/02; B62B 5/0083
USPC ...... 280/79.2, 79.5; 108/25, 50.12; 248/128, 248/519, 910
See application file for complete search history.

(56) References Cited

U.S. PATENT DOCUMENTS

| | | | | |
|---|---|---|---|---|
| 1,321,713 A | * | 11/1919 | Buie | B62B 5/06 |
| | | | | 280/47.371 |
| 1,820,843 A | * | 8/1931 | Spitz | A01G 9/04 |
| | | | | 280/79.5 |
| 3,119,585 A | * | 1/1964 | Austenson | A47G 33/1213 |
| | | | | 248/524 |
| 3,528,676 A | * | 9/1970 | Marcandalli | A47G 7/041 |
| | | | | 280/79.5 |

(Continued)

FOREIGN PATENT DOCUMENTS

DE  202020100191 U1 * 5/2020 ............. A45B 23/00

*Primary Examiner* — Robert Canfield
(74) *Attorney, Agent, or Firm* — The Patent Professor, P.A.; John Rizvi

(57) ABSTRACT

An improved movable decorative base assembly is provided that includes a receptacle having a bottom, at least one upstanding side wall forming a hollow interior and an open top. The base assembly includes a wheeled, base carriage on which the receptacle may be placed. The decorative base assembly further includes a pole receiver, which is carried by the base carriage and has a receiving hole for attaching a tube or other elongated body carrying a parasol canopy. The receiving hole of the pole receiver aligns with a through hole in the bottom of the receptacle, allowing the elongated body to extend through the receptacle and attach to the pole receiver, the assembly forming a unitary body which can be rolled on a floor or surface. The decorative base assembly allows safe, comfortable, and stable maneuvering, while alleviating physical strains otherwise felt by those utilizing alternative assemblies.

15 Claims, 13 Drawing Sheets

(56) References Cited

U.S. PATENT DOCUMENTS

| | | | | |
|---|---|---|---|---|
| 4,167,271 | A * | 9/1979 | Jorgensen | B65F 1/1468 280/79.5 |
| 5,035,445 | A | 7/1991 | Poulin | |
| 5,088,751 | A * | 2/1992 | Zint | B62B 3/104 280/79.5 |
| 5,220,740 | A | 6/1993 | Brault | |
| D356,412 | S * | 3/1995 | Hensley, Jr. | D34/27 |
| 5,472,220 | A * | 12/1995 | Stephan | B62B 5/0083 280/79.5 |
| 5,806,867 | A * | 9/1998 | Hampton | B62B 5/06 280/79.5 |
| 5,875,578 | A | 3/1999 | Grewe | |
| 5,957,145 | A | 9/1999 | Plumer | |
| 5,979,793 | A * | 11/1999 | Louis | A45B 3/00 239/289 |
| 6,128,853 | A | 10/2000 | Klonel et al. | |
| 6,199,818 | B1 * | 3/2001 | Tsappi | A01G 9/124 248/524 |
| 6,257,152 | B1 * | 7/2001 | Liu | B62B 3/16 280/33.998 |
| 6,367,494 | B1 * | 4/2002 | Tung | E01F 9/662 135/48 |
| 6,374,839 | B2 * | 4/2002 | Patarra | A45C 11/20 135/16 |
| 6,386,560 | B2 | 5/2002 | Calendar | |
| 6,419,246 | B1 * | 7/2002 | Neal | B62B 5/0083 280/79.5 |
| 6,488,293 | B1 * | 12/2002 | Mitchell | B62B 3/104 280/79.5 |
| 6,594,951 | B1 * | 7/2003 | Reynolds | A47G 7/041 47/39 |
| D485,055 | S * | 1/2004 | Taylor | D3/10 |
| 6,895,982 | B1 * | 5/2005 | Shaw | E04H 12/2246 135/16 |
| 6,964,423 | B1 * | 11/2005 | Chieh | B62B 5/0083 280/79.5 |
| 6,979,005 | B1 * | 12/2005 | McLerran | B62B 3/00 280/32.6 |
| 7,017,228 | B2 | 3/2006 | Silverstein et al. | |
| 7,347,428 | B2 | 3/2008 | Edenso | |
| 7,364,172 | B1 * | 4/2008 | Archer | B62B 3/104 280/79.5 |
| D578,749 | S * | 10/2008 | Ng | D3/10 |
| 7,677,580 | B2 * | 3/2010 | Vanderberg | B62B 3/10 280/79.5 |
| 7,823,907 | B1 * | 11/2010 | Coholan | B62B 15/008 280/79.5 |
| 8,029,006 | B2 * | 10/2011 | Kalajyan | B62B 3/16 280/651 |
| 8,555,904 | B1 | 10/2013 | Lai | |
| 8,641,060 | B2 * | 2/2014 | Starr | A47J 47/16 280/79.5 |
| 8,672,287 | B2 * | 3/2014 | Li | E04H 12/2238 248/521 |
| 8,833,709 | B2 | 9/2014 | Weng | |
| 8,876,130 | B2 * | 11/2014 | Cummins | B62B 3/12 280/79.5 |
| 8,919,361 | B2 * | 12/2014 | Ma | F16M 7/00 280/30 |
| D732,817 | S * | 6/2015 | Elstow | D3/10 |
| 9,045,253 | B2 | 6/2015 | Hacko et al. | |
| D754,462 | S * | 4/2016 | Volz | D6/708 |
| 9,511,786 | B1 * | 12/2016 | Hickcox | B62B 3/008 |
| 9,974,369 | B1 * | 5/2018 | DePaolo | E04H 12/2246 |
| 10,051,931 | B2 * | 8/2018 | Zadie | F24S 25/00 |
| 10,100,969 | B1 | 10/2018 | Zhu et al. | |
| 10,492,377 | B2 * | 12/2019 | Volin | E04H 12/2246 |
| 10,780,906 | B2 * | 9/2020 | Takyar | B65D 19/0095 |
| 10,850,920 | B1 * | 12/2020 | Allen | B62B 5/0093 |
| 11,173,939 | B2 * | 11/2021 | Hassell | B65D 21/0212 |
| 11,203,369 | B2 * | 12/2021 | McMillan | B62B 5/0093 |
| 2001/0054433 | A1 * | 12/2001 | Patarra | A45C 11/20 62/331 |
| 2002/0101050 | A1 * | 8/2002 | Trine | B62B 5/0083 280/79.5 |
| 2005/0151336 | A1 * | 7/2005 | Neuman | B62B 3/04 280/79.11 |
| 2005/0189005 | A1 * | 9/2005 | Smith | G09F 23/00 135/16 |
| 2005/0205727 | A1 | 9/2005 | Nerger | |
| 2006/0054206 | A1 | 3/2006 | Bilotti | |
| 2007/0102031 | A1 * | 5/2007 | Edenso | A01G 9/02 135/15.1 |
| 2007/0290471 | A1 * | 12/2007 | Sexton | B65F 1/02 280/79.5 |
| 2010/0107488 | A1 * | 5/2010 | King | A01G 13/0212 47/20.1 |
| 2011/0126724 | A1 * | 6/2011 | Armstrong | B65F 1/1405 220/495.08 |
| 2012/0024330 | A1 * | 2/2012 | Ma | A45B 23/00 280/30 |
| 2012/0025050 | A1 * | 2/2012 | Ma | E04H 12/2238 74/532 |
| 2012/0285497 | A1 * | 11/2012 | Li | F16M 13/02 248/522 |
| 2014/0077467 | A1 * | 3/2014 | Galante | B62B 5/00 280/35 |
| 2014/0284893 | A1 * | 9/2014 | Faber | B62B 3/006 280/79.2 |
| 2014/0300070 | A1 * | 10/2014 | Veronie | B62B 5/0086 280/79.2 |
| 2015/0083172 | A1 * | 3/2015 | Boal | A45B 11/00 135/16 |
| 2016/0001828 | A1 | 1/2016 | Cates | |
| 2016/0326765 | A1 * | 11/2016 | Barbret | E04H 15/28 |
| 2018/0022155 | A1 * | 1/2018 | Davis | B60B 33/0023 414/469 |
| 2022/0104614 | A1 * | 4/2022 | Schneiderman | A45B 23/00 |

* cited by examiner

MOVABLE DECORATIVE BASE ASSEMBLY SELECTIVELY ATTACHABLE TO A PARASOL OR UMBRELLA

CROSS-REFERENCE TO RELATED APPLICATION

This application claims the benefit of U.S. Provisional Patent Application No. 62/829,956, filed on Apr. 5, 2019, which is incorporated by reference herein in its entirety.

FIELD OF THE INVENTION

The present invention relates generally to a movable decorative base assembly, and more particularly, to a movable decorative base assembly that may be selectively attached to a parasol/umbrella, and allows safe, comfortable, and stable maneuvering, while alleviating physical strains otherwise felt by those utilizing conventional alternatives.

BACKGROUND OF THE INVENTION

A potential detriment to health, often overlooked yet encountered daily, is the direct exposure to ultraviolet rays (UV) from the sun. Excessive UV exposure may result in dimerization of DNA (i.e., the process that produces an additional reaction in which two molecules of the same compound react with each other to give a distinct and different molecular species), a likely first step in the development of cancer. With the increasing global incidence of cancer, research findings have contributed to the success and popularity of products whose sole purpose is to subdue the severity of hazardous carcinogens.

Unfortunately, there are numerous activities that demand constant exposure to sunlight and thus lead to long exposure to UV rays and a consequent physical risk. For example, 1 in every 3 households in the U.S. grow some type of vegetable or fruit and most, if not all, of these households manage their gardens at least weekly. In another example, there are many who enjoy lounging near a pool or alternative body of water, such as the beach or lake, or lounging on a patio, to read a book, meditate and/or eat or drink. Furthermore, it is common for people to enjoy outdoor barbecuing or carry out daily outdoor work functions. While these may seem as tame and innocuous activities, over 90% of all cases of skin cancer is attributed to overexposure to UV rays, and the incident of skin cancers in the U.S. has increased over 70% between 1994 and 2014. This undoubtedly makes a case for an increased need for modes of UV ray protection. Particularly, when lounging and or gardening outdoors.

One familiar technology originally designed thousands of years ago for the specific reason of blocking sunlight was the parasol/umbrella. Although initially invented with an attention to function over form, recent decades have flipped this perception and made it a popular and decorative must-have for the beach and/or an outdoor living area such as a backyard. Additionally, with the unprecedented pace of climate change introducing greater climatic variations, these parasols are being increasingly sought after. However, the manner in which they are regarded is dreadfully outdated, since both form and function can coexist within this design.

As established, the medium utilized for blocking exposure to UV rays while maintaining a satisfactory degree of popular outdoor activities have been around, yet none provide the multifaceted application of serving as a decorative accessory that is movably accessible. The standard sun umbrella (or parasol) requires an impractical weighted base of sand or water devoid of wheels. A user may find it unjustifiably difficult to continuously drag the heavy weight across the terrain or surface to remain protected and may ultimately refrain from doing so. Other adaptations of the parasol include the use of a pair of wheels, requiring tipping of the heavy base for proper movement. These methods are surprisingly unfit and dangerous, in some instances, for the majority of individuals who maintain their gardens during the daytime—often retired elderly. Having nothing but cumbersome and antiquated options to protect themselves from the sun, many have opted to use no protection at all, trading their health for convenience. It would therefore be both beneficial and stylish to have a device capable of providing protection from harmful UV sunlight that is not considered cumbersome and difficult to use while working or lounging in an outdoor space.

Accordingly, there is a need for a solution to at least one of the aforementioned problems. For instance, there is a need for an easily movable umbrella solution to which a parasol or umbrella can be firmly attached upon. This design may make it safer by enhancing comfort and stable maneuvering, and include safety features that prevent unwanted movement and tipping during windy days, all the while alleviating physical strains felt by those who utilize the device as they spend time outdoors.

SUMMARY OF THE INVENTION

The present invention is directed to a movable decorative base assembly selectively attachable to a parasol or umbrella. The movable decorative base assembly is configured to provide rolling mobility to the parasol and to carry elements such as soil, plants, stones, etc. which provide a weighting effect granting increased stability to the parasol in windy conditions or while being rollingly transported.

In a first implementation of the invention, a movable decorative base assembly comprises a base carriage, a pole receiver and a receptacle. The base carriage has wheels providing rolling mobility to the base carriage. The pole receiver includes a receiving hole configured for the attachment thereto of an elongated body configured to carry a parasol canopy. The receptacle comprises a bottom and at least one upstanding side wall extending from the bottom of the receptacle forming an interior space and an open top. The bottom of the receptacle comprises a through hole. The movable decorative base assembly is configured to adopt an assembled position in which the bottom of the receptacle rests on the base carriage, and the receiving hole of the pole receiver and the through hole of the receptacle are aligned enabling the elongated body to attach to the receiving hole of the pole receiver. In the assembled position, the receptacle, pole receiver and base carriage are jointly rollingly movable by the wheels of the base carriage.

In a second aspect, the pole receiver may be integrally-formed with the base carriage.

In another aspect, the pole receiver may include an upstanding collar. The receiving hole may be provided in the upstanding collar. When the movable decorative base assembly is arranged in the assembled position, the upstanding collar may extend through the through hole of the bottom of the receptacle.

In another aspect, the pole receiver may be formed as a separate part attachable to the base carriage. When the movable decorative base assembly is arranged in the assembled position, the pole receiver may be adjacent to the base carriage.

In another aspect, the base carriage may include a blind hole configured to receive the pole receiver in the assembled position of the movable decorative base assembly.

In another aspect, the pole receiver may further include a flat base. The upstanding collar may extend from the flat base. The flat base of the pole receiver may be received in the blind hole of the base carriage and may be sandwiched between the base carriage and the bottom of the receptacle when the movable decorative base assembly is arranged in the assembled position.

In another aspect, the flat base of the pole receiver may be received in the blind hole of the base carriage such that a top surface of the flat base is flush with a top surface of the base carriage.

In another aspect, the receptacle may include two or more through holes, the pole receiver may include two or more through holes, and the base carriage may include two or more holes. When the movable decorative base assembly is arranged in the assembled position, each through hole of the receptacle may align with a respective through hole of the two or more through holes of the pole receiver and with a respective hole of the two or more holes of the base carriage forming a respective resulting hole configured to receive a respective fastener therethrough non-movably securing the receptacle, pole receiver and base carriage to one another.

In another aspect, the respective fastener may threadingly engage the respective hole of the two or more holes of the base carriage when the movable decorative base assembly is arranged in the assembled position.

In another aspect, the base carriage may have a flat top surface, and the bottom of the receptacle may have a flat exterior surface opposite to the interior space of the receptacle. The flat exterior surface of the receptacle may rest on the flat top surface of the base carriage when the movable decorative base assembly is arranged in the assembled position.

In another aspect, the movable decorative base assembly may further include at least one towing connector configured for the attachment thereto of a towing utensil configured to allow the pulling thereon in order to rollingly move the movable decorative base assembly.

In yet another aspect, the at least one towing connector a include at least one of a ring or arm.

In another aspect, the at least one towing connector may include one or more towing connectors provided in the base carriage.

In another aspect, the at least one towing connector may include at least one slot formed through the base carriage.

In yet another aspect, the receiving hole of the pole receiver may include an internal thread configured to threadingly engage with a threaded end of the elongated body configured to carry a parasol canopy.

In another aspect, the movable decorative base assembly may further include the elongated body. The elongated body may include a tube assembly configured to receive a parasol shaft. The tube may have an aperture and a locking mechanism configured to secure the parasol shaft to the tube.

In another aspect, the movable decorative base assembly may further comprise a cover arrangeable to cover the open top of the receptacle. The cover may include a through hole. The through hole of the cover may be in coaxial alignment with the receiving hole of the pole receiver when the movable decorative base assembly is arranged in the assembled position.

In another aspect, the elongated body may be received in the receiving hole of the pole receiver and through the through hole of the cover, and may extend upwardly form the cover, when the movable decorative base assembly is arranged in the assembled position. Also in the assembled position, the cover may be rotatable relative to the receptacle about the elongated body.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
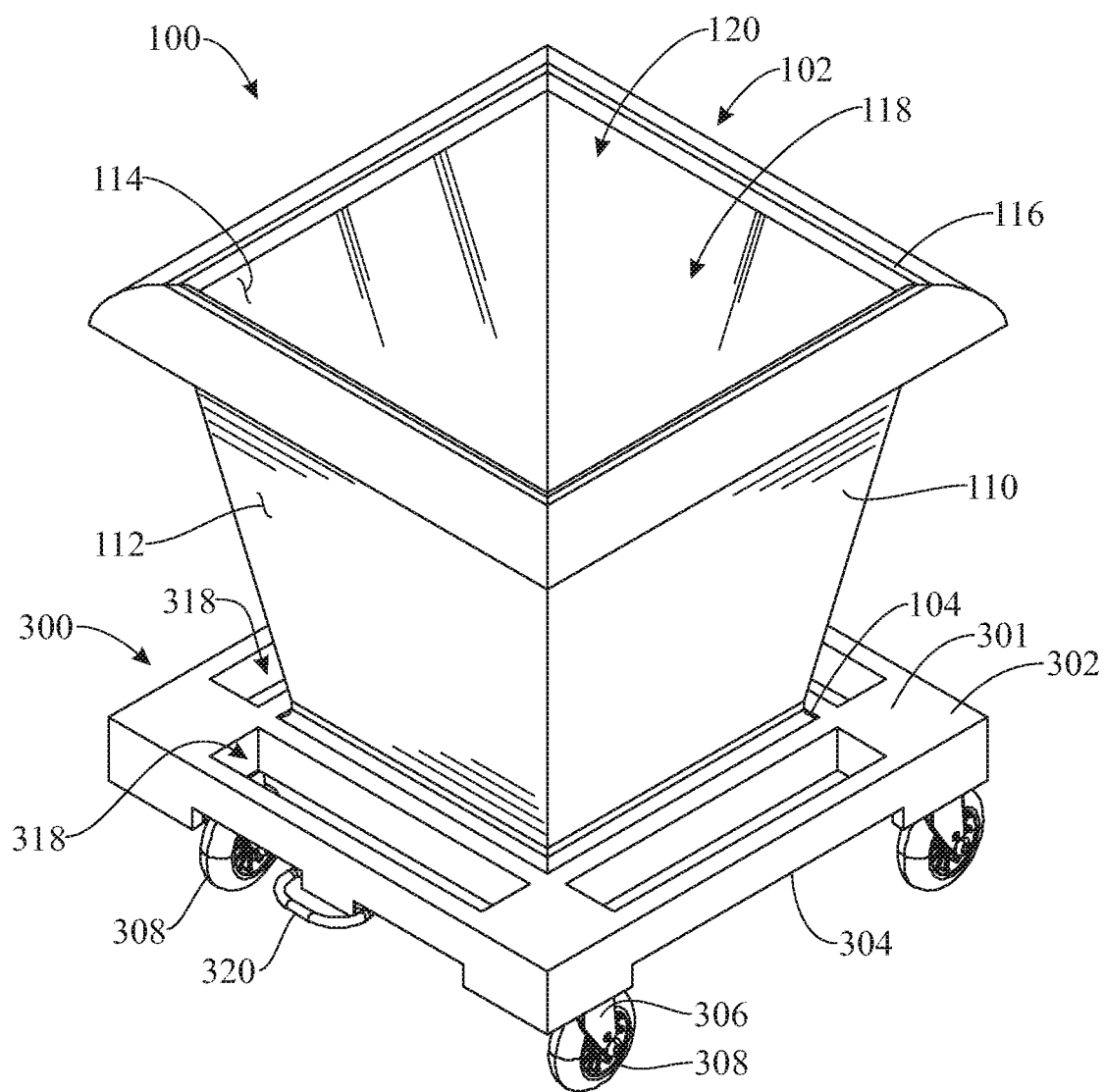
FIG. 1 presents a top perspective view showing a first illustrative embodiment of the movable decorative base assembly.
Figure 4:
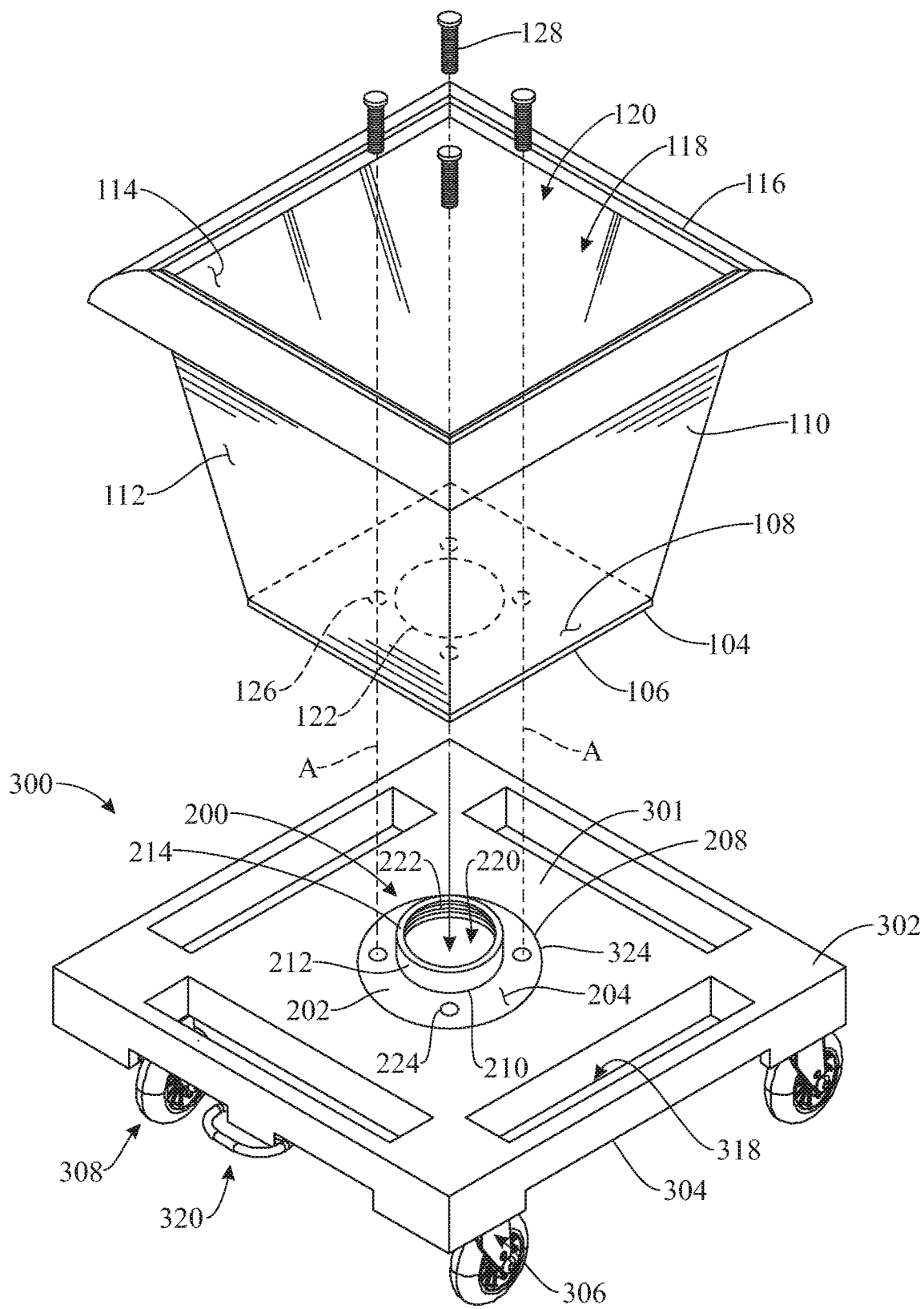
FIG. 4 presents a top perspective view of the tetherable decorative base assembly of FIG. 1, showing how the top receptacle of the base assembly is attached to the base carriage using the mounting head.

The present invention is generally directed toward a movable decorative base assembly that is attachable to a parasol, umbrella, or the like. The movable decorative base assembly (hereinafter referred to as "the base assembly"), is generally referenced as reference numeral 100. Referring initially to FIGS. 1 and 4, the base assembly 100 generally comprises a receptacle 102 that includes a flat bottom 104 providing an exterior surface 106 and an interior surface 108. Projecting upwardly from the flat bottom 104 is an upstanding side wall 110, which provides an exterior wall surface 112 and an interior wall surface 114. Depending on the shape of the receptacle 102, there may be only one upstanding side wall 110. For instance, if the receptacle were in the shape of a circle or cylinder (not shown), a singular continuous cylindrical sidewall would be provided. In the drawings, however, a receptacle having four upstanding side walls 110 extending from one another is shown for illustrative purposes. This particular embodiment should not be construed as limiting, but rather as an exemplary embodiment of a receptacle that may be employed. For the sake of clarity, and brevity, the remaining features described will be done to exemplify this particular structure. That being said, it should be readily understood to a person skilled in the art to apply the same principles hereinafter described to any shaped receptacle that is desired (e.g., circular, triangular, pentagonal, etc.).

Figure 5:
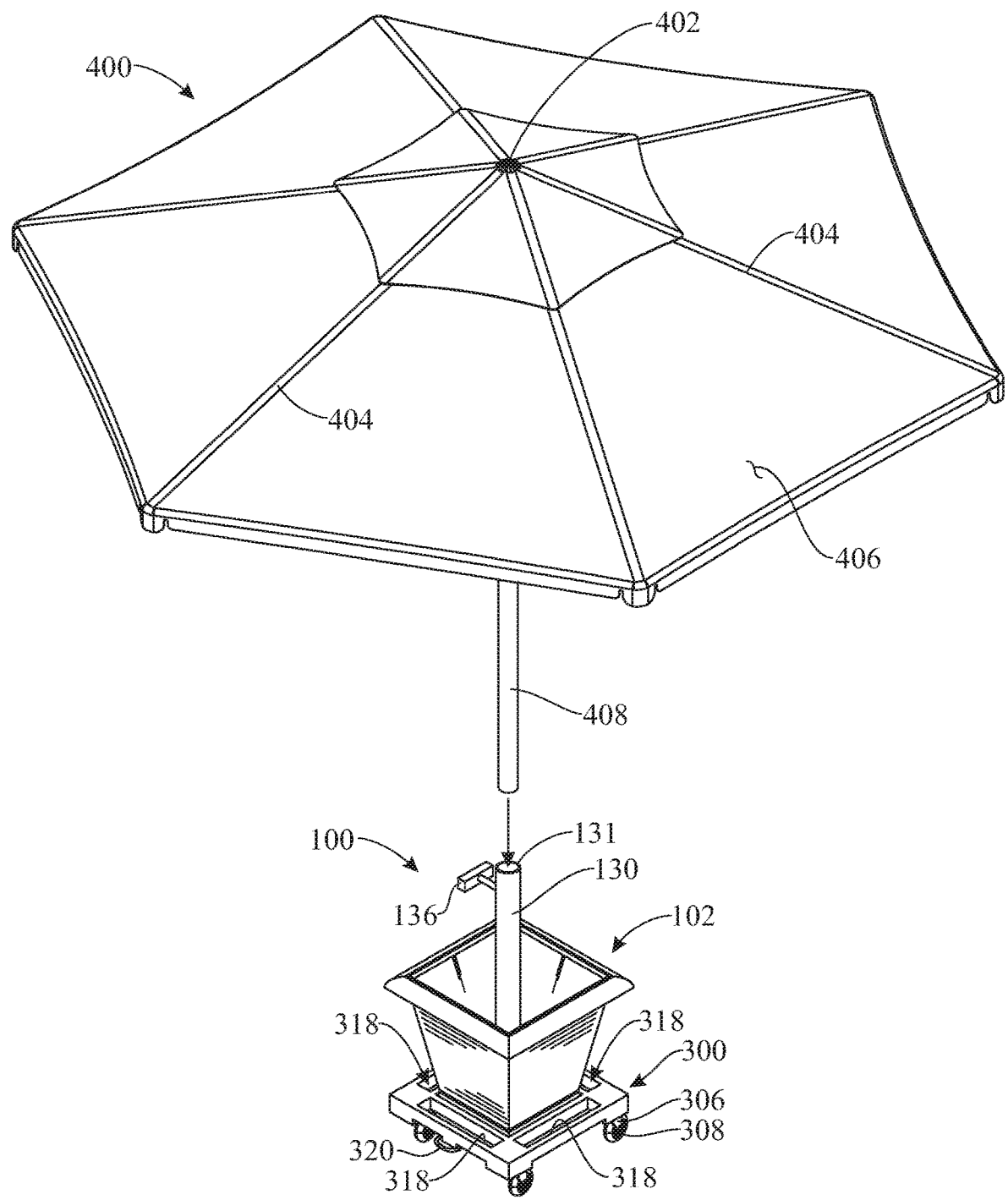
FIG. 5 presents a top perspective view of a parasol being selectively coupled to the decorative base shown in FIG. 1, by inserting the shaft of the parasol into the receiving end of a tube that is threadably attached to the base's carriage.
Figure 6:
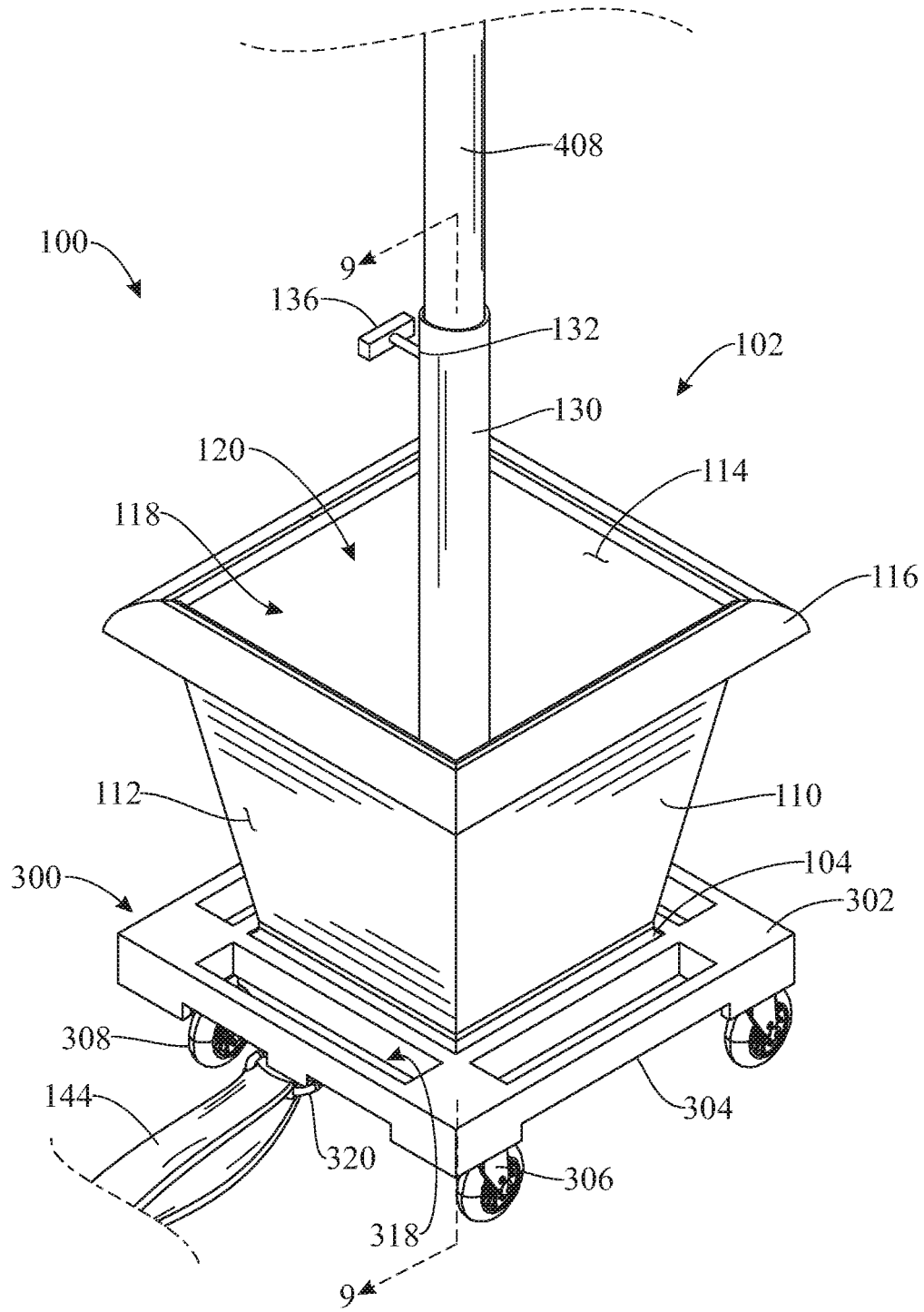
FIG. 6 presents a partial perspective view of the parasol's shaft coupled and fastened to the decorative base assembly.
Figure 9:
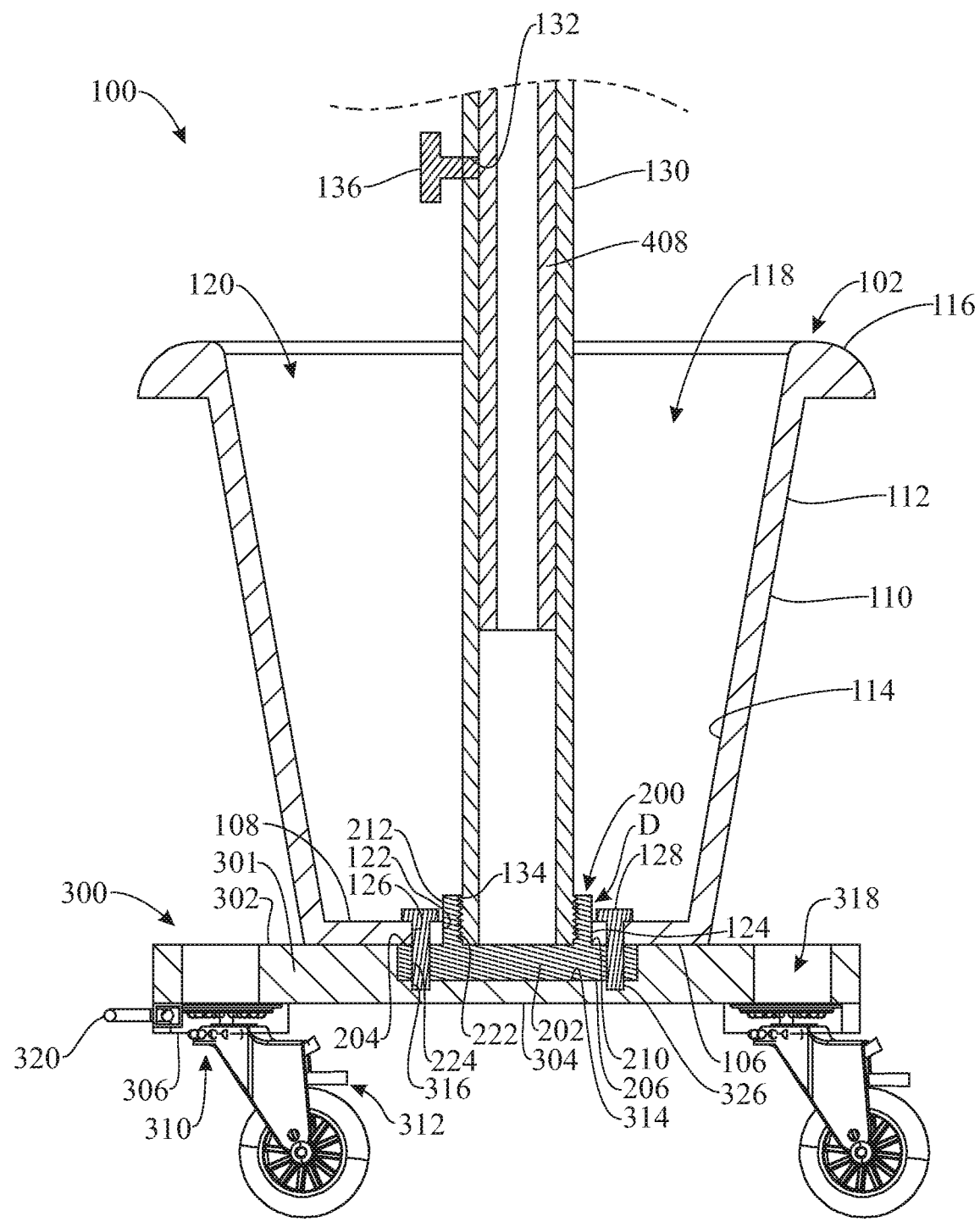
FIG. 9 presents a cross-sectional view of the movable decorative base assembly taken along section plane 9-9 indicated in FIG. 6.

The upstanding side walls 110 of the receptacle 102 terminate at a rim 116, and form a hollow interior or interior space 118 with an open top 120. Although the interior space 118 of the receptacle 102 is shown empty, the interior space 118 may be filled with a fluid and/or any form of soil desired once the assembly process of the base assembly 100 is complete, as will be described in greater detail hereinafter. At the bottom 104 of the receptacle 102 there is a first through-hole 122 and a plurality of secondary through-holes 126. As is best illustrated in FIG. 4, the diameter of the first through-hole 122 is larger than the diameter of the plurality of secondary, through-holes 126 for reasons that will be explained further on. As shown in FIGS. 5, 6 and 9, the base assembly 100 may also include a standalone tube 130 that has an aperture 132 at its proximal end 131 and a series of external threads 134 at its distal end 133. As is best illustrated in FIG. 9, the aperture 132 may be threaded and a fastener 136 may threadably engage the aperture 132 on the tube 130 provided, as means to secure a shaft 408 of a parasol 400 to the tube 130 when necessary.

Figure 3:
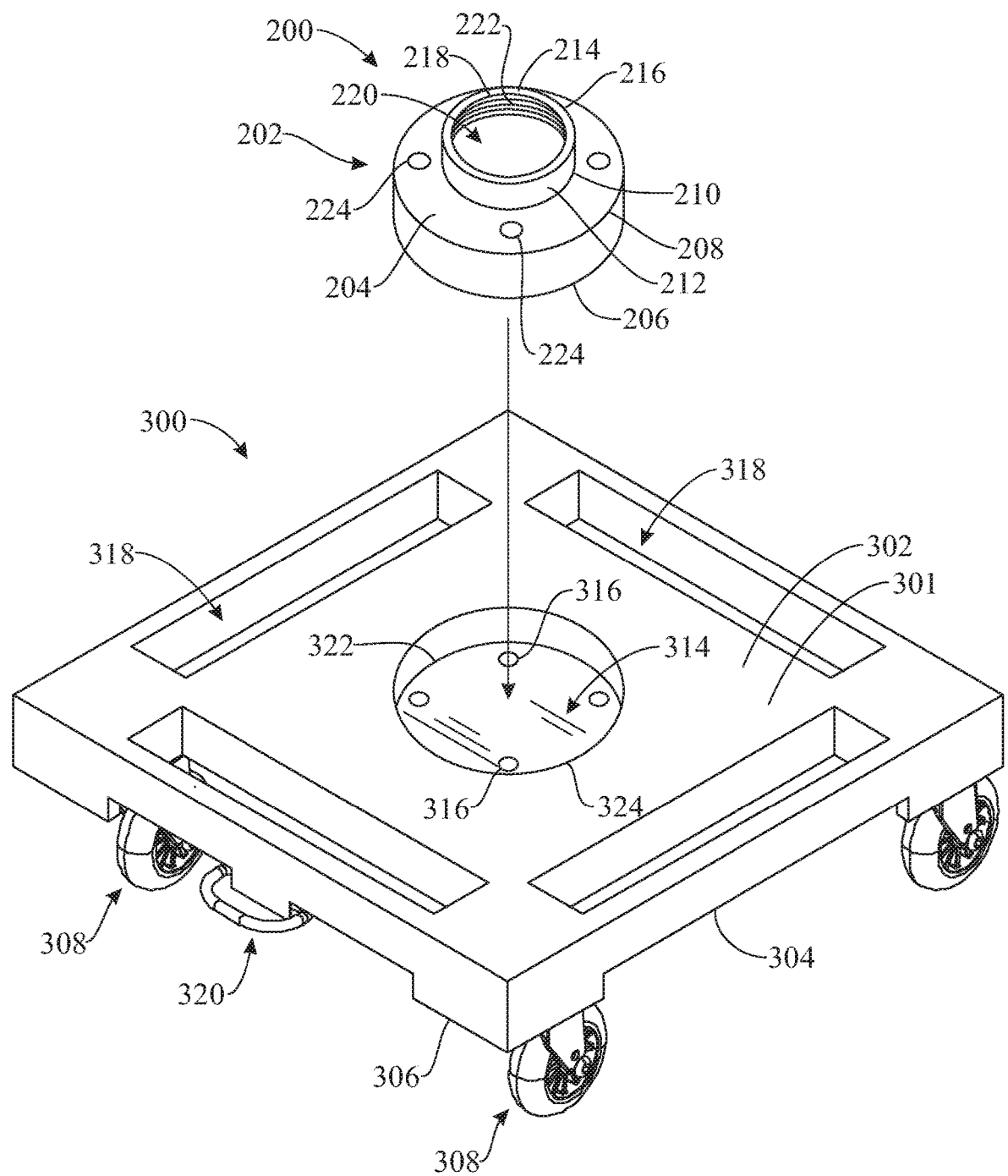
FIG. 3 presents a top perspective view of a base carriage and a pole receiver or mounting head of the movable decorative base assembly of FIG. 1, illustrating how said mounting head is attachable to said base carriage.

Referring now to FIGS. 3 and 4, the base assembly 100 may also include a pole receiver or mounting head 200 that has a base 202 that includes a flat lower surface 206 and a flat upper surface 204. Provided at the center of the base 202 of the mounting head 200 is an upstanding collar 212. The collar 212 may include a rim 214 having an outer edge 216 and an inner edge 218. The collar 212 forms a receiving hole 220, wherein the interior wall of the collar 212 may be lined with internal threads 222 configured to threadably connect to the external threads 134 of the distal end 133 of the tube 130. The mounting head 200 may also include a plurality of through-holes 224. The through-holes 224 may be disposed between an outer edge 208 and an inner edge 210 of the base 202, extending through the base 202 from the upper surface 204 to the lower surface 206 and spanning circularly or angularly around the upstanding collar 212.

Figure 2:
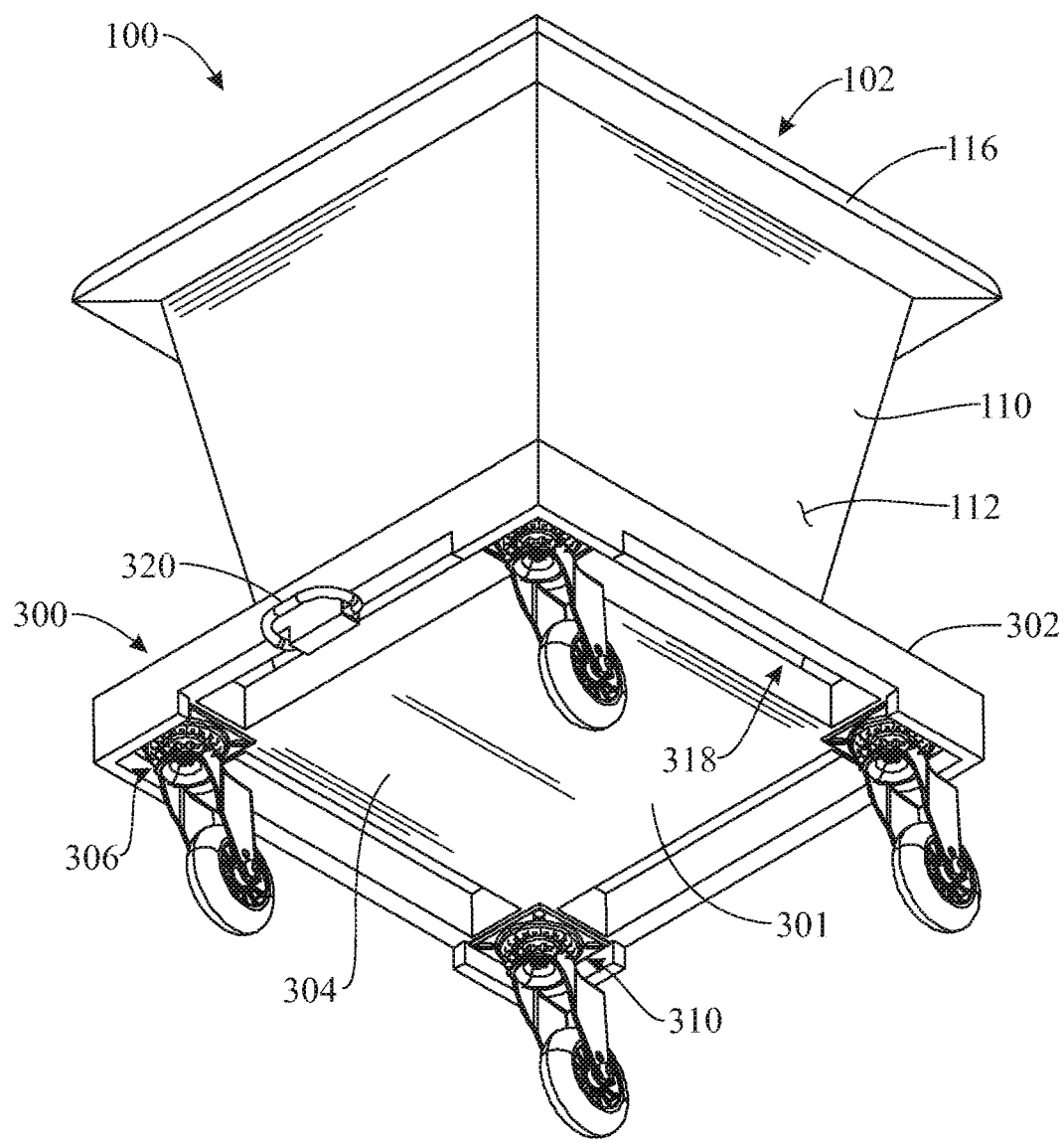
FIG. 2 presents a bottom perspective view of the movable decorative base originally illustrated in FIG. 1.
Figure 8:
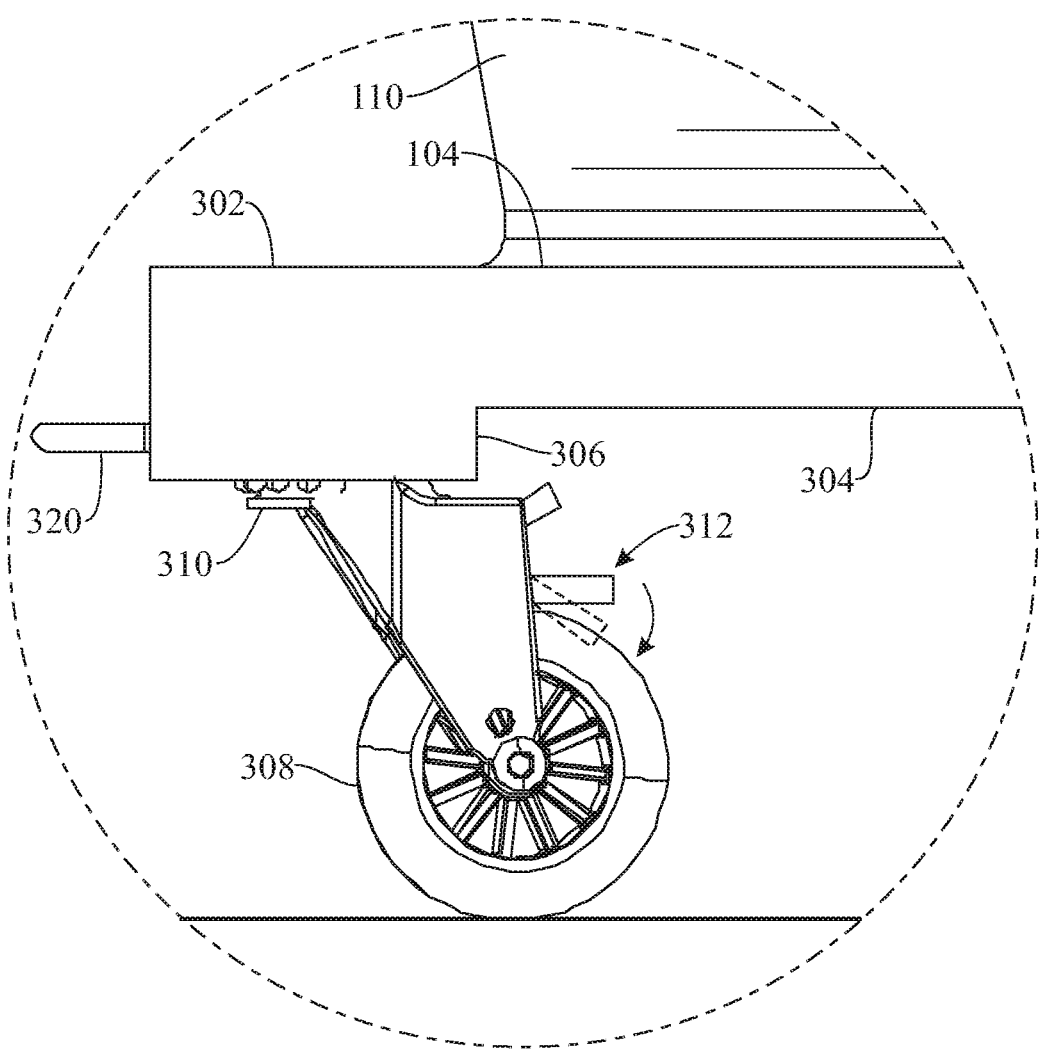
FIG. 8 presents a detailed and enlarged view of swivel and lock caster wheels bolted to the bottom end of the base carriage.

As shown for instance in FIGS. 1 and 2, the base assembly 100 may further include a base carriage 300. The base carriage 300 comprises a main body 301, which may be generally plate-shaped, as shown, and have a flat top 302 and a bottom 304. At the bottom 304 there are a plurality of wheel supports 306 that couple the base carriage 300 to wheels 308. Each wheel support 306 may also include a mechanism for multidirectional rotation 310, shown in FIG. 2. An example of a wheel type and wheel support that may be used, but should not be interpreted as limiting, are swivel caster wheels. These types of wheels are rugged and durable, and would be ideal for outdoor use. However, alternative wheels and wheel supports may be utilized depending of the surface the base assembly 100 is resting on to maximize potential mobility. For example, in the event the base assembly 100 is resting on a sandy surface, beach dolly wheels may be used. As shown in FIG. 8, in some embodiments, each wheel 308 and wheel support 306 subassembly may also include a locking mechanism 312 that prevents the rotational movement of the wheels 308 when deployed. This prevents unwanted movement of the base assembly 100 when the base is resting on a graded plane or in the event of a sudden wind shear.

As shown in FIGS. 3 and 9, included on the top 302 of the main body 301 of the base carriage 300 is a blind hole 314. Inside of the blind hole 314 is a plurality of secondary blind holes 316, which may each include internal threads 326 therein. As is best shown in FIG. 3, the diameter of the blind hole 314 on the top 302 of the main body 301 of the base carriage 300 may be substantially larger than the diameter of the plurality of secondary blind-holes 316 circularly disposed thereabout. The base carriage 300 may also include at least one towing connector for the attachment thereto of a towing utensil configured to allow the pulling thereon in order to rollingly move the movable decorative base assembly. For instance, the at least one towing connector may include a plurality of slots 318 and at least one towing connection, ring or arm 320 affixed to or integrally formed with the bottom 304 or other section of the base carriage 300.

As is best shown in FIGS. 3, 4 and 9, the receptacle 102, mounting head 200 and base carriage 300 of the base assembly 100 can be assembled to form a unitary body. The basic steps of the method of coupling the receptacle 102 to the mounting head 200 and the base carriage 300 may generally include the following.

As was previously mentioned hereinabove and is shown in FIG. 4, the diameter of the first through-hole 122 of the receptacle 102 is larger than the diameter of the upstanding collar 212 of the mounting head 200. As shown in FIG. 9, this enables a user to insert the upstanding collar 212 of the mounting head 200 through the first through-hole 122 of the receptacle 102 until the rim 214 of the collar 212 is projecting a distance D above the interior surface 108 of the flat bottom 104 of the receptacle 102. Once the collar 212 has been inserted through the first through-hole 122 of the receptacle 102, the inner edge 210 of the base 202 of the mounting head 200 is adjacent to the circumferential edge 124 of the first through-hole 122. The upper surface 204 of the base 202 of the mounting head 200 also sits flush and in fluid contact with the exterior surface 106 of the flat bottom 104 of the receptacle 102. Once the collar 212 has been inserted into the receptacle 102, the plurality of through-holes 224 of the mounting head 200 are aligned concentrically with the plurality of secondary through-holes 126 disposed about the flat bottom 104 of the receptacle, thereby forming a plurality of resulting or new through-holes.

Once the mounting head 200 has been coupled to the receptacle 102, the combination of the mounting head 200 and receptacle 102 can be coupled to the base carriage 300. The base 202 of the mounting head 200 may sit snugly inside of the first blind-hole 314 provided on the top 302 of the main body 301 of the base carriage 300. Once seated inside of the blind hole 314, the secondary plurality of blind-holes 316 circularly disposed about the first blind-hole 314 of the base carriage 300 are aligned with the aforementioned plurality of new through-holes created by the coupling of the receptacle 102 and mounting head 200, as best shown in FIG. 9. More specifically, as can be best seen in FIG. 4, each blind hole 316 of the base carriage 300 aligns with a respective secondary through-hole 124 of the receptacle 102 and a respective through-hole 224 of the mounting head 200 along a respective central axis A forming a respective resulting singular hole. A respective fastener 128 can pass through each resulting singular hole and engage the internal threads 326 disposed inside of the respective blind-hole 316 on the base carriage 300, thereby selectively securing the receptacle 102 to the base carriage 300. As an exemplary option only, the fasteners 128 considered to be used to couple the receptacle 102 to the base carriage 300 via the mounting head 200 may be bolts, screws, or the like.

As best shown in the assembled position of FIG. 9, once the base carriage 300 is coupled to the receptacle 102 via the mounting head 200, the base 202 of the mounting head 200 is sandwiched between the base carriage 300 and the flat bottom 104 of the receptacle 102, enhancing the mechanical resistance and robustness of the movable decorative base assembly 100. Once in this assembled position, with the upstanding collar 212 extending through the first through hole 122 and projecting over the interior surface 108 of the flat bottom 104 of the receptacle 102, the tube 130 may be threadably attached to the upstanding collar 212 by threading the external threads 134 of the tube 130 with the internal threads 222 of the upstanding collar 212.

Referring now to FIGS. 5-9, once the tube 130 has been selectively attached to the upstanding collar 212 of the mounting head 200 and is in an upstanding position, the shaft 408 of a parasol 400 may be coupled to the tube 130 (see particularly FIG. 9). Once the shaft 408 of the parasol 400 is inside of the tube 130, a fastener 136 may be inserted through the aperture 132 in the tube 130 and abutted against the shaft 408 of the parasol 400 to secure the shaft 408 to the tube 130 (i.e., restricting relative vertical movement and, optionally, rotational movement), while the tube 130 is in turn secured to the entire base assembly 100.

Figure 7:
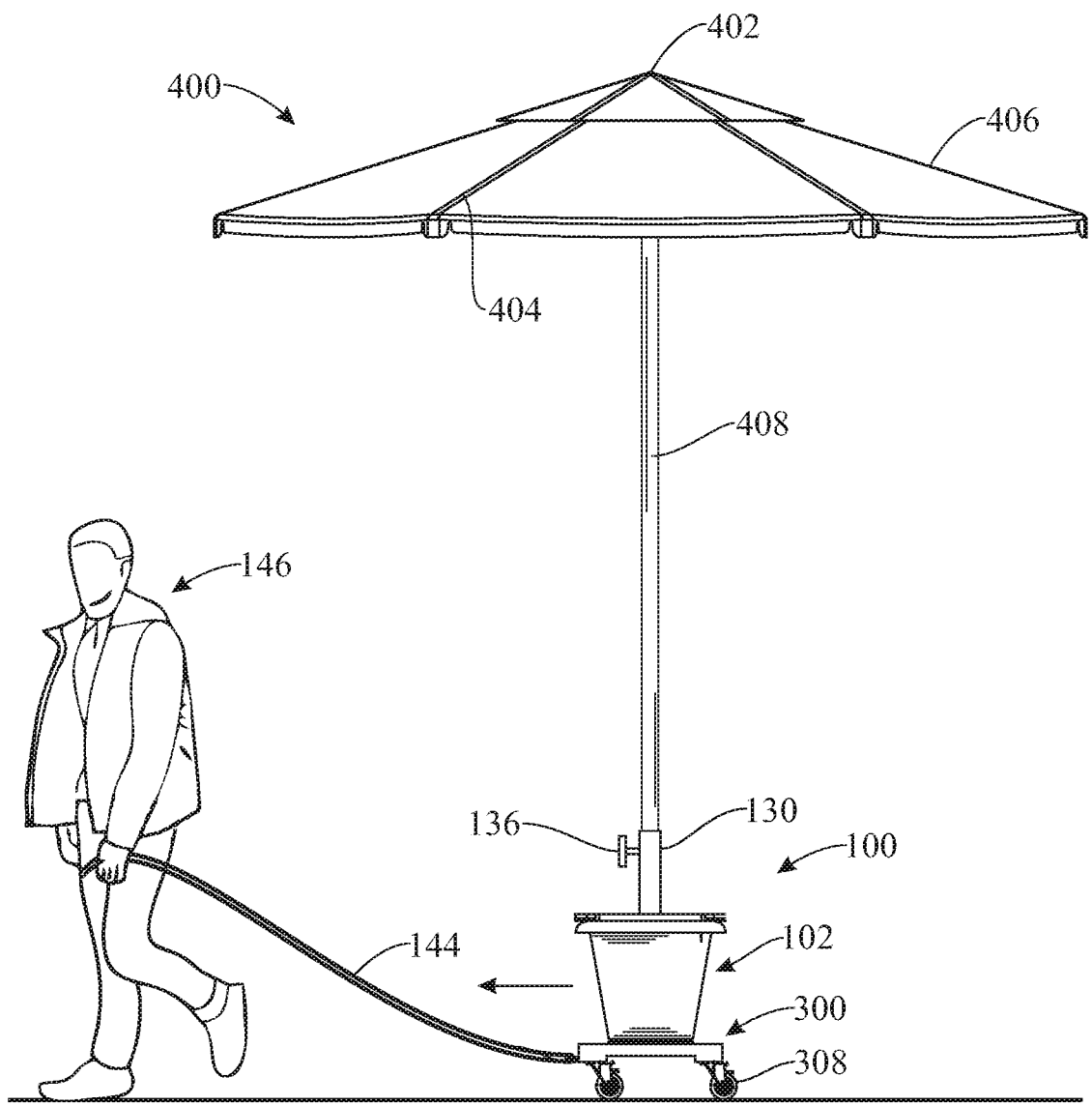
FIG. 7 presents a side perspective view of an individual electing to move the parasol attached to the decorative base assembly by holding a rope, tether or leash that is attached to the base carriage of the decorative base assembly.

Next, as shown in FIGS. 5 and 7, an individual 146 may choose to open a canopy 406 of the parasol 400 by extending a set of stretchers 404 of the parasol 400 as far outward as possible. Once the canopy 406 is open (or if desired kept closed), an individual may attach a towing utensil such as, but not limited to, a tether, leash or rope 144 to either one of the slots 318 provided on the base carriage 300, or to the towing arm 320 affixed to the bottom 304 of the base carriage 300, and pull the assembly 100 to a more desirable location. Likewise, the towing arm 320 and/or slots 318 provided on the base carriage 300 may be utilized as means to secure (i.e. tether) the base assembly 100 to a larger structure to prevent theft, or undesired movement. Notwithstanding the aforementioned, it should be readily understood that the steps of the method to couple the receptacle 102 to the mounting head 200 may vary without departing from the intended scope. In other words, the order in which the assembly process is described herein above may be altered without affecting the end result.

Once the assembly process of the base assembly 100 is complete, the individual 146 may choose to add soil and flowers (not shown) within the interior space 118 of the receptacle 102. The decorative elements added may be used as decorations to the base assembly 100 and/or as means to mimic the aesthetic appearance of a normal flower pot (which is not shown). Alternatively or additionally, the interior space 118 of the receptacle 102 may be filled with decorative stones, sand, liquid and/or other material(s) which are capable of being potted or placed within the interior space 118 of the receptacle 102. The adding of soil, flowers, sand, liquid, stones, and/or any other alternative substance to the interior space 118 of the receptacle 102 should not solely be construed as a decorative element, but alternatively or additionally as a weight additive that helps the assembly 100 remain in place.

Figure 10:
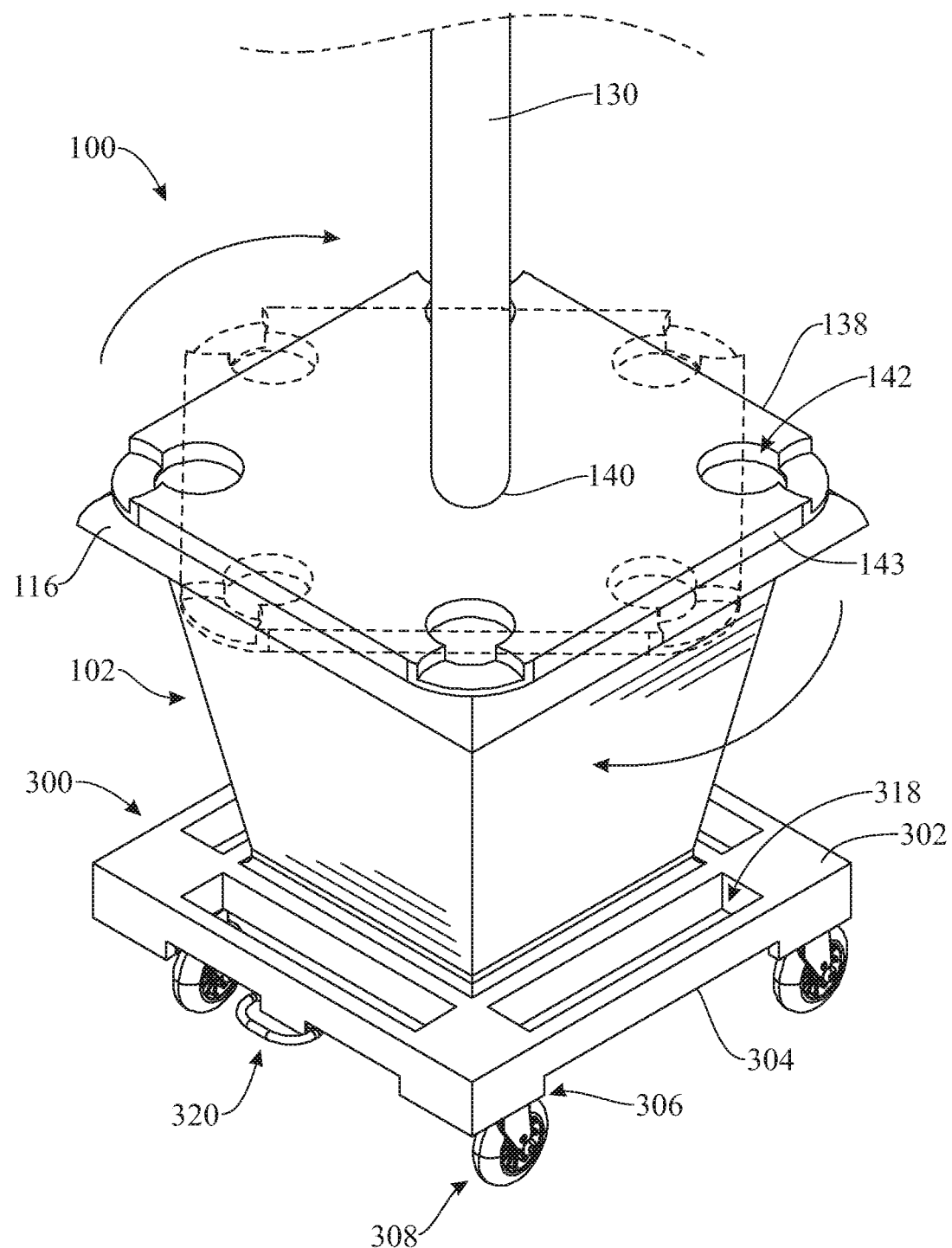
FIG. 10 presents a top perspective view of the movable decorative base assembly having a rotatable cap that includes a plurality of cup holders removably affixed to the top end portion of the base assembly's receptacle.

Turning now to FIG. 10, in some embodiments, the open top 120 of the receptacle 102 may be covered with a cover or cap 138. The rim 116 of the receptacle 102 may be beveled inwardly so that when the cap 138 is press-fitted onto the receptacle 102; outer edges 143 of the cap 138 partially engage with both the rim 116 and an inner side of the upstanding side walls 110 of the receptacle 102; slightly compressing the cap 138 to allow the cap 138 to at least partially sit inside the interior space 118 of the receptacle 102 forming a snug fit; in said embodiments, the cap 138 may be elastic and configured to recover its original shape when removed from the interior space 118 of the receptacle 102. In other embodiments, the receptacle 102 may slightly expand to allow the cap 138 to be at least partially received inside the interior space 118 of the receptacle 102 forming a snug fit; in said embodiments, the receptacle 102 may be elastic and configured to recover its original shape when the cap 138 is removed from the interior space 118 of the receptacle 102. In alternative embodiments, the cap 138 may simply rest on the rim 116 of the receptacle 102.

The cap 138 may also include a through aperture 140 that allows the tube 130, which engages the shaft 408 of the parasol 400 on one end and is attached to the collar 212 of the mounting head 200 on the other end, to pass through unimpeded. In some embodiments, such as the present embodiment, the aperture 140 may be located at a center of the cap 138. Alternatively or additionally, the cap 138 may also include one or more cup holders 142 (e.g., a plurality of cup holders 142, as shown). The cup holders 142 may be arranged at an inner or outer edge of the cap 138 (e.g., at an outer edge, as shown) enabling the remainder of the upper surface of the cap 138 to function as a serving table top if so desired. In some embodiments, the shaft 408 may be rotationally received within the aperture 140, allowing the cap 138 to rotate relative to the receptacle 102 about a central longitudinal axis of the shaft 408, as shown in the figure. Such rotation may enable a user to reposition the cap 138 for different purposes; for instance, a user may wish to rotate the cap 138 in order to reposition a certain feature on the cap 138 (e.g., the one or more cup holders 142) without having to reposition the entire movable decorative base assembly 100 and parasol 400 carried thereon, which may be relatively heavy.

Figure 11:
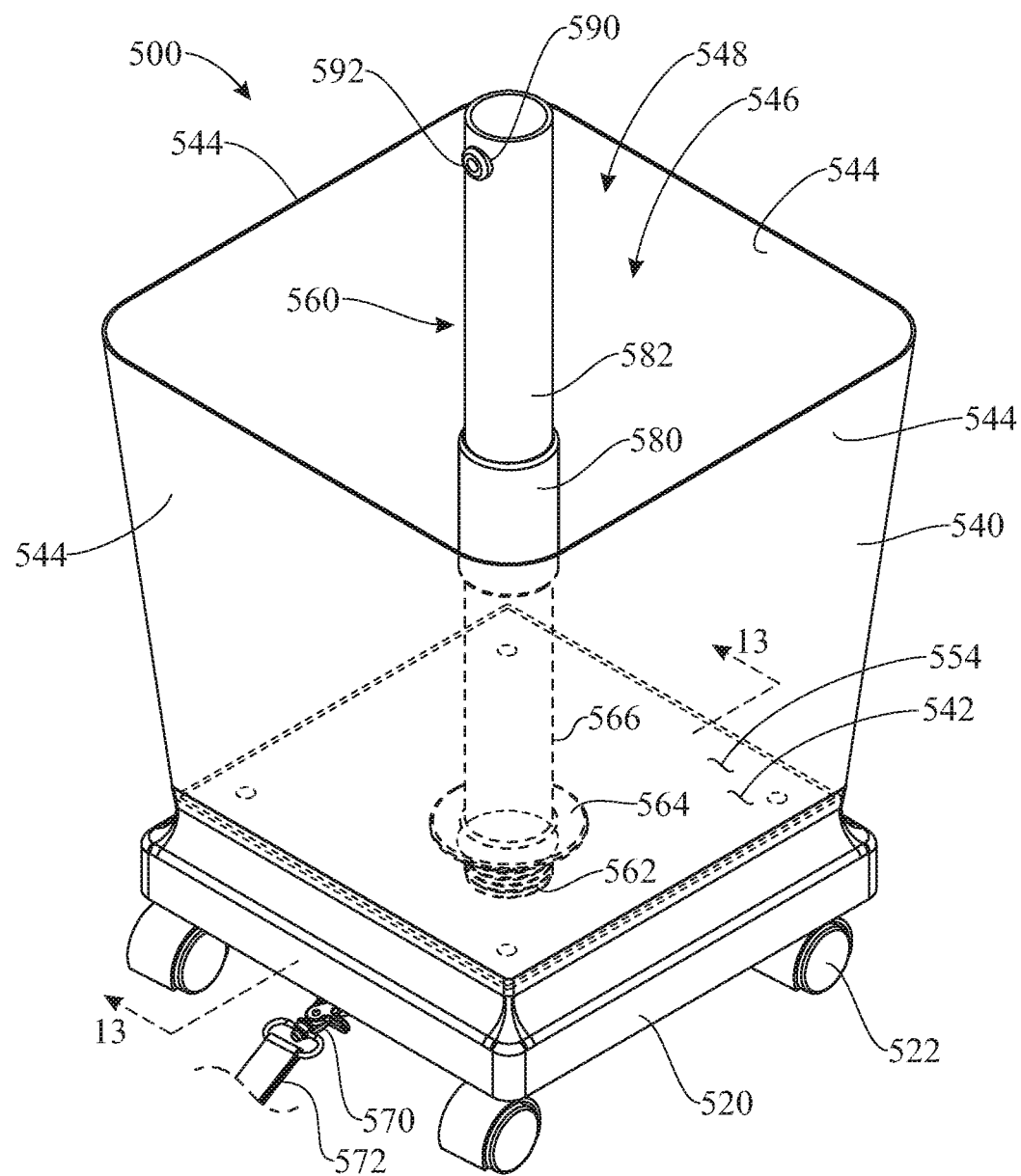
FIG. 11 presents a top perspective view showing a second illustrative embodiment of the movable decorative base assembly.
Figure 12:
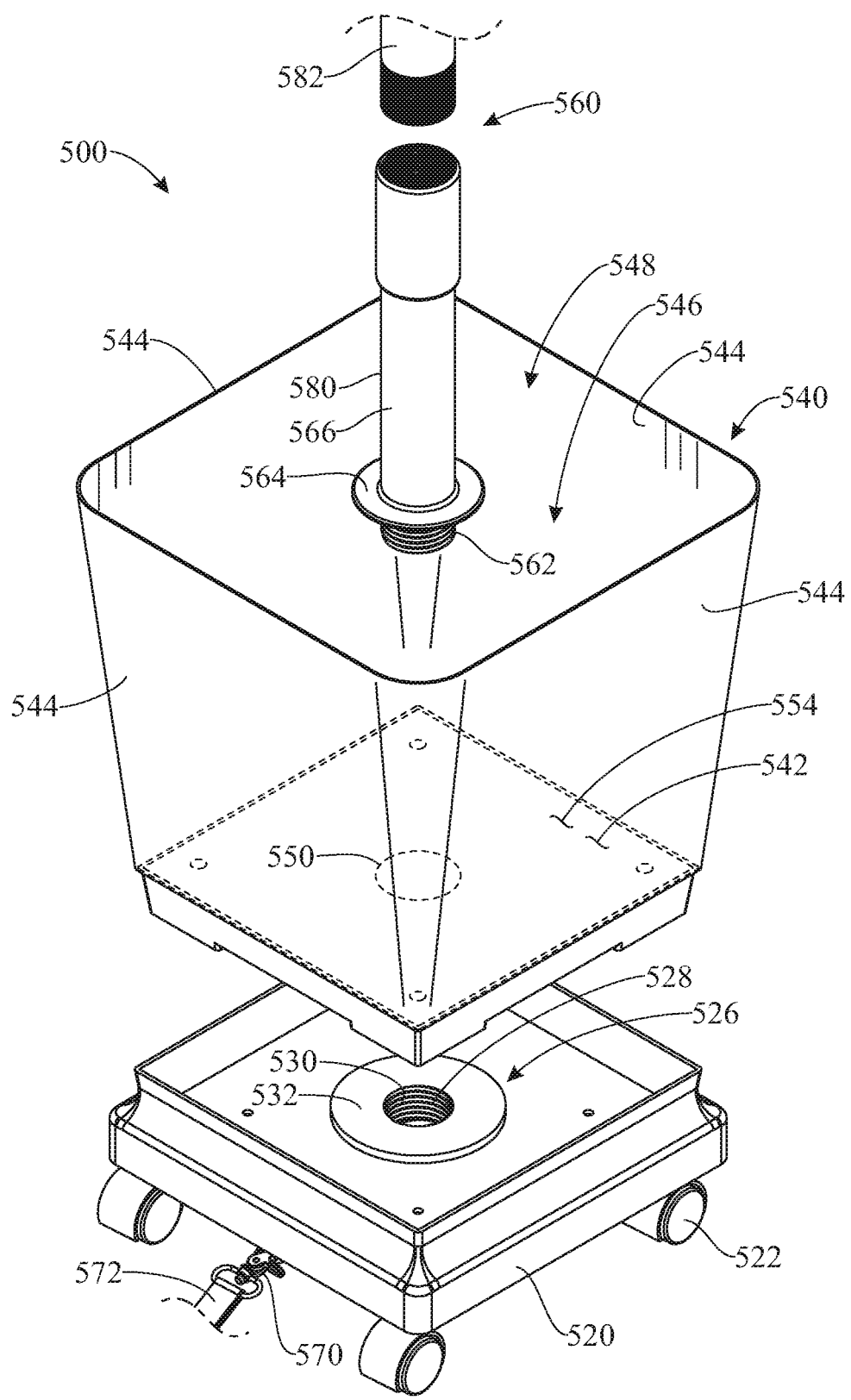
FIG. 12 presents an exploded, top isometric view of the movable decorative base assembly of FIG. 11.
Figure 13:
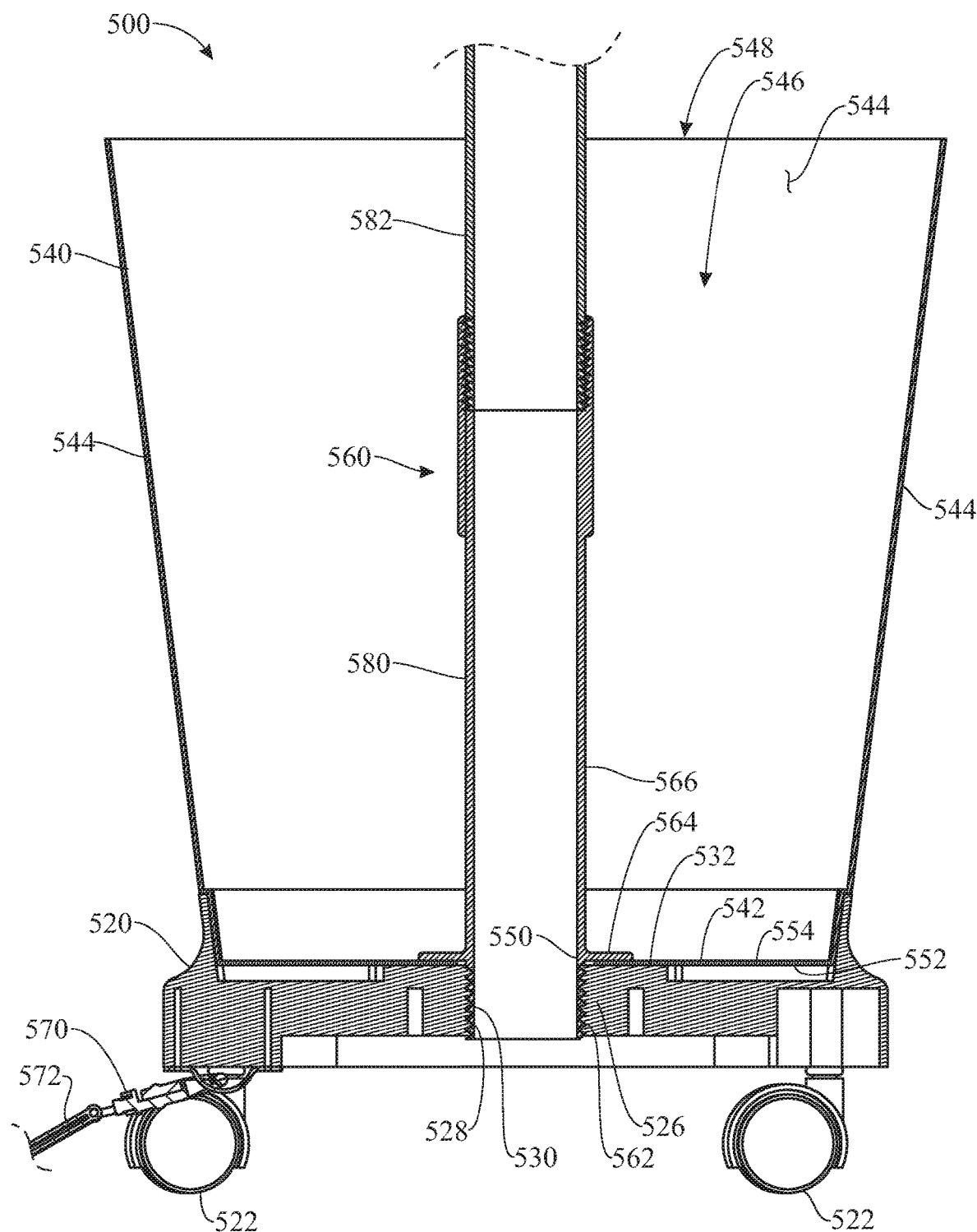
FIG. 13 presents a cross-sectional side elevation view of the movable decorative base assembly of FIG. 11, the cross section taken along section plane 13-13.

The illustrations of FIGS. 11-13 show a movable decorative base assembly 500 in accordance with a second illustrative embodiment of the invention. Similarly to the previous embodiment, the movable decorative base assembly 500 includes a base carriage 520 and a receptacle 540. The base carriage 520 comprises a set of wheels 522 providing rolling mobility to the base carriage 520. A pole receiver 526 is carried by the base carriage 520 and includes a receiving hole 528 configured for the attachment thereto of an elongated body or tube 560 configured to carry a parasol canopy (for example, parasol canopy 406). Also similarly to the previous embodiment, the receiving hole 528 comprises an internal thread 530. However, unlike the previous embodiment, in which the pole receiver (mounting head 200) is formed as a separate body or part relative to the base carriage (base carriage 300), the pole receiver 526 of the present embodiment is integrally-formed with the base carriage 520. For instance, the base carriage 520 may be manufactured by plastics injection molding into a single-piece unit comprising the pole receiver 526.

As in the previous embodiment, the receptacle 540 has a bottom 542 and at least one upstanding side wall 544 extending from the bottom 542 of the receptacle forming an interior space 546 and an open top 548. The interior space 546 is configured to receive the aforementioned tube 560, and optionally be filled with one or more decorative and/or weight elements as described with reference to the previous embodiment. The bottom 542 of the receptacle 540 comprises a through hole 550.

The movable decorative base assembly 500 is configured to adopt an assembled position, shown in FIGS. 11 and 13. In this position, the bottom 542 of the receptacle 540 rests on the base carriage 520; more specifically, as shown, a flat exterior surface 552 of the bottom 542 of the receptacle 540 (the flat exterior surface 552 arranged opposite to the interior space 546) rests on a flat top surface 532 of the base carriage 520, also shown in FIG. 12. In this assembled positon of FIGS. 11 and 13, the through hole 550 of the receptacle 540 and the receiving hole 528 of the pole receiver 526 are aligned, i.e. arranged in vertical registration with one another. The elongated body or tube 560 may be extended therethrough and may attach to the receiving hole 528 of the pole receiver 526; more specifically, a threaded end 562 of the tube 560 may threadingly engage with the internal threads 530 of the receiving hole 528 of the pole receiver 526. In this assembled position, the receptacle 540, the pole receiver 526, the base carriage 520, the elongated body or tube 560 and the umbrella attached thereto may be jointly rollingly transported along a floor or surface via the wheels 522 of the base carriage 520.

Also similarly to the previous embodiment, the movable decorative base assembly 500 of the present embodiment may further include at least one towing connector 570 for the attachment thereto of a towing utensil 572 which may be pulled on in order to rollingly move the movable decorative base assembly 500. For instance and without limitation, the towing utensil 572 may include a strap, band, rope, chain, etc. In turn, the at least one towing connector 570 may include a ring (as shown), an arm, etc. Preferably, as shown, the at least one towing connector 570 may be provided in the base carriage 520, facilitating the towing of receptacles devoid of a towing connector or a structure configured to facilitate pulling thereon. Though not specifically shown herein, the base carriage 520 may be provided with at least one slot formed through the base carriage 520, similarly to slots 318, to facilitate towing the base carriage 520.

Furthermore, as best shown in FIGS. 12 and 13, the tube 560 may include a flange 564 protruding outwardly, and preferably radially, from a cylindrical sidewall 566 of the tube 560. The flange 564 is located proximally to the threaded end 562 of the tube 560 and configured to contact a flat interior surface 554 of the bottom 542 of the receptacle 540 when the movable decorative base assembly 500 is arranged in the assembled position, increasing lateral stability of the tube 560 and umbrella attached thereto as the movable decorative base assembly 500 and umbrella are jointly rolled along a surface, or in windy or rainy weather conditions that may destabilize the umbrella.

With reference to FIGS. 11 and 12, in some embodiments, the tube 560 may be comprised of several separate tubular bodies or tube segments that are disconnectably attachable to one another, or telescopically connected to one another, to allow for more compact storage of the tube 560. For instance, in the present drawings, the tube 560 includes a bottom tube segment 580 and a top tube segment 582 which may be disconnectably threaded to one another. While not shown, this separable configuration of the tube may also be applied to other embodiments of the invention, such as to the movable decorative base assembly 100 of FIG. 1.

As further shown in FIG. 11, the tube 560 may further include an aperture 590 and a locking mechanism 592 which may be selectively inserted into or retracted form the aperture 590 to respectively abut against, or separate from, an umbrella or parasol shaft that is fitted into the tube 560. By abutting the locking mechanism 592 against the parasol shaft, the shaft may be prevented from moving within the tube 560, contributing to stabilize the parasol. In some embodiments, the locking mechanism 592 may threadingly engage the aperture 590.

In summary, the movable decorative base assembly disclosed herein grants stability and rolling mobility to a parasol or umbrella in an aesthetically pleasing manner, and constitutes a safe and effective solution for providing adjustable shading in homes or commercial installations (e.g. hotels, restaurants, etc.). Furthermore, the parasol and/or the movable decorative base assembly, and more particularly the receptacle and/or the cap, may optionally be decorated with drawings, logos, corporate colors or images, etc. to meet the needs of the user or commercial installation.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:
1. A movable decorative base assembly, comprising:
   a base carriage comprising wheels providing rolling mobility to the base carriage;
   an elongated body configured to carry a parasol canopy, the elongated body comprising a bottom end;

a flange, integrally formed with the elongated body, the flange arranged above and protruding outwardly from the bottom end of the elongated body;

a pole receiver carried by the base carriage, the pole receiver having a receiving hole configured for the attachment thereto of the elongated body; and a receptacle having a bottom and at least one upstanding side wall extending from the bottom of the receptacle forming an interior space and an open top, wherein the bottom of the receptacle comprises a through hole; wherein the movable decorative base assembly is configured to adopt an assembled position in which the bottom of the receptacle rests on the base carriage, and the receiving hole of the pole receiver and the through hole of the receptacle are aligned, and further in which the bottom end of the elongated body extends through the through hole of the receptacle and is attached to the receiving hole of the pole receiver below the through hole of the receptacle, and the flange extends over and contacts the bottom of the receptacle, and further in which the receptacle, pole receiver, elongated body and base carriage are jointly rollingly movable by the wheels of the base carriage.

2. The movable decorative base assembly of claim 1, wherein the pole receiver is integrally-formed with the base carriage.

3. The movable decorative base assembly of claim 1, wherein the base carriage has a flat top surface, and the bottom of the receptacle has a flat exterior surface opposite to the interior space of the receptacle, wherein the flat exterior surface of the receptacle rests on the flat top surface of the base carriage when the movable decorative base assembly is arranged in the assembled position.

4. The movable decorative base assembly of claim 1, further comprising at least one towing connector configured for the attachment thereto of a towing utensil configured to allow the pulling thereon in order to rollingly move the movable decorative base assembly.

5. The movable decorative base assembly of claim 4, wherein the at least one towing connector comprises at least one of a ring or arm.

6. The movable decorative base assembly of claim 4, wherein the at least one towing connector comprises one or more towing connectors provided in the base carriage.

7. The movable decorative base assembly of claim 6, wherein the at least one towing connector comprises at least one slot formed through the base carriage.

8. The movable decorative base assembly of claim 1, wherein the bottom end of the elongated body is threaded, and further wherein the receiving hole of the pole receiver comprises an internal thread configured to threadingly engage with the threaded, bottom end of the elongated body.

9. The movable decorative base assembly of claim 1, the elongated body comprising a tube assembly configured to receive a parasol shaft, the tube assembly comprising an aperture and a locking mechanism configured to secure the parasol shaft to the tube assembly.

10. The movable decorative base assembly of claim 1, further comprising a cover arrangeable to cover the open top of the receptacle, the cover comprising a through hole, wherein the through hole of the cover is in coaxial alignment with the receiving hole of the pole receiver when the movable decorative base assembly is arranged in the assembled position.

11. The movable decorative base assembly of claim 10, wherein the elongated body is received in the receiving hole of the pole receiver and through the through hole of the cover, and extends upwardly from the cover, when the movable decorative base assembly is arranged in the assembled position, and further wherein the cover is rotatable relative to the receptacle about the elongated body when the movable decorative assembly is arranged in the assembled position.

12. The movable decorative base assembly of claim of claim 1, wherein the flange is integrally formed with and extends radially outward of a cylindrical sidewall of the elongated body, and further wherein, in the assembled position, the flange flatly rests on a flat interior surface of the bottom of the receptacle.

13. The movable decorative base assembly of claim of claim 1, wherein the elongated body comprises a bottom tube segment and a top tube segment, wherein the bottom end of the elongated body and the flange are provided in the bottom tube segment, and further wherein, in the assembled position, the top tube segment is attached to and extends upward from the bottom tube segment.

14. The movable decorative base assembly of claim of claim 13, wherein the top tube segment and bottom tube segment are disconnectably attachable to one another, and further wherein, in the assembled position, the top tube segment and bottom tube segment are disconnectably attached to one another.

15. The movable decorative base assembly of claim of claim 14, wherein the top tube segment and bottom tube segment are threadingly attachable to one another, and further wherein, in the assembled position, the top tube segment and bottom tube segment are threaded to one another.

* * * * *